US008867378B2

(12) United States Patent
Balasubramanian et al.

(10) Patent No.: US 8,867,378 B2
(45) Date of Patent: Oct. 21, 2014

(54) TRIGGERING MULTI-CARRIER REQUESTS

(75) Inventors: Srinivasan Balasubramanian, San Diego, CA (US); Vipin A. Sali, San Clemente, CA (US)

(73) Assignee: QUALCOMM Incorporated, San Diego, CA (US)

( * ) Notice: Subject to any disclaimer, the term of this patent is extended or adjusted under 35 U.S.C. 154(b) by 500 days.

(21) Appl. No.: 12/244,260

(22) Filed: Oct. 2, 2008

(65) Prior Publication Data

US 2009/0092055 A1    Apr. 9, 2009

Related U.S. Application Data

(60) Provisional application No. 60/978,073, filed on Oct. 5, 2007.

(51) Int. Cl.
| | | |
|---|---|---|
| G01R 31/08 | (2006.01) | |
| H04W 4/00 | (2009.01) | |
| H04W 72/04 | (2009.01) | |
| H04W 4/12 | (2009.01) | |
| H04L 12/54 | (2013.01) | |
| H04L 12/701 | (2013.01) | |
| H04L 12/801 | (2013.01) | |
| H04L 12/835 | (2013.01) | |
| H04L 12/919 | (2013.01) | |
| H04L 12/911 | (2013.01) | |
| H04W 8/18 | (2009.01) | |

(52) U.S. Cl.
CPC ............ *H04W 72/0406* (2013.01); *H04W 8/18* (2013.01); *H04W 4/12* (2013.01); *H04L 12/5695* (2013.01); *H04L 45/00* (2013.01); *H04L 47/10* (2013.01); *H04L 47/12* (2013.01); *H04L 47/14* (2013.01); *H04L 47/30* (2013.01); *H04L 47/765* (2013.01); *H04L 47/824* (2013.01); *H04W 72/04* (2013.01)
USPC .......................................... 370/252; 370/329

(58) Field of Classification Search
CPC .................................. H04W 4/12; H04W 8/18
USPC .......................................... 370/235, 329, 437
See application file for complete search history.

(56) References Cited

U.S. PATENT DOCUMENTS 6,754,189 B1 *   6/2004   Cloutier et al. ............... 370/329
7,477,900 B2      1/2009   Gorsuch et al.
(Continued)

FOREIGN PATENT DOCUMENTS

JP          2002510447 A        4/2002
JP          2006094005 A        4/2006
(Continued)

OTHER PUBLICATIONS

International Search Report and Written Opinion—PCT/US2008/078837, International Search Authority—European Patent Office—Mar. 25, 2009.

(Continued)

*Primary Examiner* — Brandon Renner
(74) *Attorney, Agent, or Firm* — Kevin T. Cheatham

(57) ABSTRACT

Systems and methodologies are described that facilitate triggering multi-carrier requests at a mobile device and granting or denying the request at the access point. The mobile device can determine when to request additional carriers from the access point based on communication parameters, such as buffer levels, inflow/outflow data rates, PA headroom for handling an additional carrier, a timer for requesting the carrier, a maximum number of allocable carriers, and/or the like. Upon receiving the request, the access point can grant or deny the request based at least in part on subscriber level of the mobile device, available resources in the access point, reverse link throughput, and/or the like. Allocating additional carriers to the mobile device can increase throughput for communicating with the access point.

29 Claims, 11 Drawing Sheets

(56) References Cited

U.S. PATENT DOCUMENTS

| | | | |
|---|---|---|---|
| 2002/0042275 A1 | 4/2002 | Kitazawa et al. | |
| 2003/0035388 A1 | 2/2003 | Schmidt | |
| 2004/0001536 A1* | 1/2004 | Lohtia et al. | 375/225 |
| 2004/0160915 A1* | 8/2004 | Gorsuch et al. | 370/329 |
| 2004/0162097 A1* | 8/2004 | Vijayan et al. | 455/522 |
| 2004/0185825 A1* | 9/2004 | Preiss et al. | 455/405 |
| 2005/0111462 A1 | 5/2005 | Walton et al. | |
| 2005/0250509 A1* | 11/2005 | Choksi | 455/452.1 |
| 2006/0013133 A1* | 1/2006 | Peng et al. | 370/230 |
| 2006/0221925 A1* | 10/2006 | Beathard | 370/342 |
| 2007/0127489 A1 | 6/2007 | Amaya et al. | |
| 2007/0160915 A1* | 7/2007 | Willard et al. | 430/5 |
| 2007/0206503 A1* | 9/2007 | Gong et al. | 370/238 |

FOREIGN PATENT DOCUMENTS

| | | |
|---|---|---|
| WO | WO9859523 A2 | 12/1998 |
| WO | WO2006096789 A1 | 9/2006 |
| WO | WO2007056630 | 5/2007 |

OTHER PUBLICATIONS

Spencer Q H et al.: "Channel allocation in multi-user MIMO wireless communications systems" Communications, 2004 IEEE International Conference on Paris, France Jun. 20-24, 2004, Piscataway, NJ, USA,IEEE, vol. 5, Jun. 20, 2004, pp. 3035-3039, XP010709760 ISBN: 978-0-7803-8533-7 p. 3035, paragraph "I. Introduction" p. 3037 "III. Sub-Channel Allocation" figure 2.
Taiwan Search Report—TW097138348—TIPO—Nov. 22, 2011.

* cited by examiner

TRIGGERING MULTI-CARRIER REQUESTS

CROSS-REFERENCE TO RELATED APPLICATIONS

The present Application for Patent claims priority to Provisional Application No. 60/978,073 entitled "METHOD AND APPARATUS FOR TRIGGERING MULTI-CARRIER REQUESTS" filed Oct. 5, 2007, and assigned to the assignee hereof and hereby expressly incorporated by reference herein.

BACKGROUND

I. Field

The following description relates generally to wireless communications, and more particularly to triggering multi-carrier requests in wireless communication networks.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. In multi-carrier systems, a plurality of carriers can be allocated for communication over one or more of the multiple antennas to facilitate simultaneous communication thereover, which inherently increases communication throughput between devices utilizing the multiple carriers. The base station can allocate the plurality of carriers to the mobile device upon establishment of communication.

SUMMARY

The following presents a simplified summary of one or more embodiments in-order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating triggering of multi-carrier allocation requests. In one example, a mobile device can request additional carriers from an access point based at least in part on change in one or more communication parameters, such as a buffer level, inflow/outflow comparison, PA headroom, timer for requesting an additional carrier, and/or the like. The one or more communication parameters can be compared to threshold values to determine whether an additional carrier should be requested. Moreover, the access point can grant the additional carrier upon receiving the request based at least in part on additional considerations, such as subscriber level of the mobile device, reverse link activity, and/or the like, for example.

According to related aspects, a method for requesting one or more additional carriers in a wireless communication network is provided. The method can comprise communicating with an access point over one or more carriers and detecting a change in one or more communication parameters with respect to a threshold value for the communication parameters. The method can further include requesting one or more additional carriers from the access point based at least in part on the detected change.

Another aspect relates to a wireless communications apparatus. The wireless communications apparatus can include at least one processor configured to communicate with a base station over at least one assigned carrier and monitor one or more communication parameters to detect change with respect to a threshold value for the one or more communications parameters. The processor is further configured to request an additional carrier assignment from the base station based at least in part on the detected change. The wireless communications apparatus further comprises a memory coupled to the at least one processor.

Yet another aspect relates to a wireless communications apparatus that facilitates requesting additional carriers over a wireless network. The wireless communications apparatus can comprise means for communicating with an access point over one or more assigned carriers and means for determining change in one or more communications parameters with respect to a related threshold value. The wireless communications apparatus can additionally include means for requesting at least one additional carrier from the access point based at least in part on the change.

Still another aspect relates to a computer program product, which can have a computer-readable medium including code for causing at least one computer to communicate with an access point over one or more carriers. The computer-readable medium can also comprise code for causing the at least one computer to detect a change in one or more communication parameters with respect to a threshold value for the communication parameters. Moreover, the computer-readable medium can comprise code for causing the at least one computer to request one or more additional carriers from the access point based at least in part on the detected modification.

Another aspect relates to an apparatus. The apparatus comprises a transceiver that facilitates communicating with an access point over one or more carriers and a communication parameter evaluator that determines change in one or more communications parameters based at least in part on comparison to a respective threshold value. The apparatus further comprises a carrier requester that requests an additional carrier from the access point based at least in part on the determined change.

According to a further aspect, a method that facilitates allocating additional carriers in wireless communication networks is provided. The method includes receiving a request for at least one additional carrier assignment from a mobile device and determining a subscription level for the mobile device. The method further includes allocating an additional carrier to the mobile device based at least in part on the subscription level and available resources.

Another aspect relates to a wireless communications apparatus. The wireless communications apparatus can include at least one processor configured to communicate with a mobile device over one or more assigned carriers and receive a request for allocation of an additional carrier from the mobile device. The processor is further configured to allocate an additional carrier to the mobile device based at least in part on the request, a determined subscription level of the mobile device, and available resources. The wireless communications apparatus further comprises a memory coupled to the at least one processor.

Yet another aspect relates to a wireless communications apparatus for allocating additional carriers to one or more mobile devices. The wireless communications apparatus can comprise means for receiving a request for an additional carrier assignment from a mobile device and means for receiving a subscription level of the mobile device. The wireless communications apparatus can additionally include means for assigning an additional carrier to the mobile device based at least in part on the subscription level.

Still another aspect relates to a computer program product, which can have a computer-readable medium including code for causing at least one computer to receive a request for at least one additional carrier assignment from a mobile device. The computer-readable medium can also comprise code for causing the at least one computer to determine a subscription level for the mobile device. Moreover, the computer-readable medium can comprise code for causing the at least one computer to allocate an additional carrier to the mobile device based at least in part on the subscription level and available resources.

Another aspect relates to an apparatus. The apparatus comprises a transceiver that communicates with a mobile device over one or more allocated carriers and receives a request for an additional carrier from the mobile device and a subscription level detector that determines a subscription level of the mobile device. The apparatus further comprises a carrier allocator that allocates an additional carrier to the mobile device based at least in part on the subscription level and available resources.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
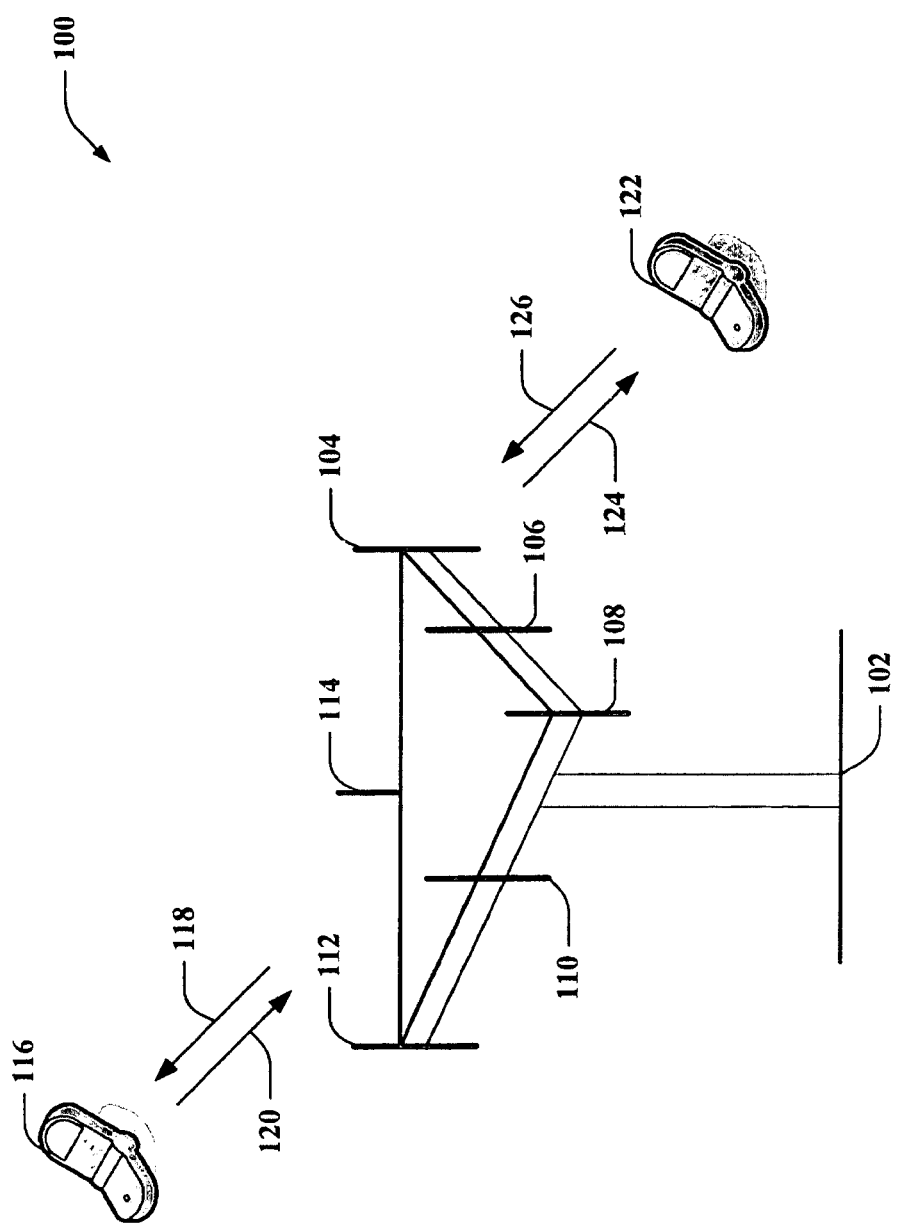
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). The techniques described herein can also be utilized in evolution data optimized (EV-DO) standards, such as 1xEV-DO revision B or other revisions, and/or the like. Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g. forward link, reverse link, . . . ) such as FDD, TDD, and the like. In one example, the base station 102 and/or mobile devices 116/122 can receive information from each other and/or additional mobile devices/base stations by employing a wideband multicarrier transceiver (e.g., rake receiver), which can be integrated or otherwise. For example, the wideband multicarrier transceiver (not shown) can comprise multiple receivers that simultaneously receive signals from disparate frequencies over a plurality of carriers. Carriers, in this context, can refer to frequency carriers, or other types of bandwidth portions, such as OFDM allocable units. In this example, the allocable units can be tones (e.g., a single slot) or other minimum allocable units defined by the mobile devices 116 and/or 122, such as a number of slots over a number of subcarriers schedulable in a subframe, and/or the like. For example, in asynchronous OFDM configurations, the defined allocable units can be different for uplink and downlink. Thus, increased throughput is achieved by the base station 102 and/or mobile devices 116/122, as they can receive and demodulate multiple signals over a given time period. Moreover, the base station 102 can dynamically allocate carriers for receiving data based at least in part on determinations made at the base station 102 and/or mobile devices 116/122, as described herein.

According to an example, the mobile devices 116/122 can request additional carriers from the base station 102 based at least in part on change in one or more communication parameters. In one example, the communication parameters can relate to a buffer level in the mobile devices 116/122 for buffering data to transmit to the base station 102, for example. When the buffer level of a mobile device 116 and/or 122 increases beyond a threshold, the mobile device 116 and/or 122 can request one or more additional carriers from the base station 102 to facilitate increased throughput, which can lower the buffer level, in one example. It is to be appreciated that requesting the additional carrier(s) can be based on additional parameters, such as power amplifier (PA) headroom to handle not only control channels for the carriers, but the carriers themselves, a timer for making the request, a number of carriers already allocated to the mobile device 116 and/or 122, etc., as described further herein. In addition, an inflow/outflow data rate can be utilized in addition to or alternatively to the buffer level.

In addition, the base station 102 need not grant additional carrier requests. Additional factors can be considered by the base station 102 before granting the additional carriers. In one example, the base station 102 can grant requested carriers based at least in part on a subscriber level of the mobile device 116 and/or 122 (as well as a number of carriers currently allocated). Granting additional carriers by the base station 102 can be further based in part on reverse link data activity of the mobile devices 116 and/or 122 as well as available resources in the base station 102. In this regard, multiple carriers can be triggered for dynamic allocation from the base station 102 to the mobile devices 116 and/or 122 based at least in part on considerations made independently at each component.

Figure 2:
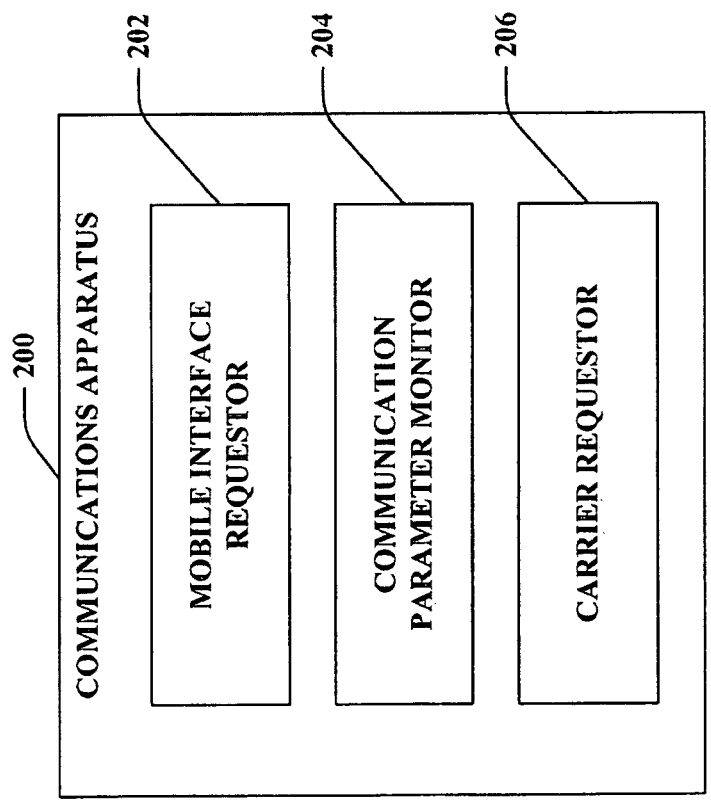
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. In this regard, the communications apparatus 200 can be one that comprises an application layer as well as a protocol layer (such as a smartphone, cellular phone, or similar device) or that comprises the protocol layer and communicates with an application on a disparate device (such as a laptop and cellular modem configuration). The communications apparatus 200 can include a mobile interface requestor 202 that can facilitate retrieval and/or specification of upper layer communication parameters by accessing a mobile interface, a communication parameter monitor 204 that can continuously evaluate one or more communication parameters (e.g., retrieved via mobile interface requestor 202 or otherwise), and a carrier requestor 206 that can request additional carriers for communication with other devices (not shown). In one example, the mobile interface requestor 202 can retrieve variables or parameters such as a protocol layer buffer level for transmitting data to one or more devices, a protocol layer inflow data rate, a lower layer outflow data rate, and/or the like.

According to an example, the mobile interface requestor 202 can be utilized at an advanced mobile subscriber software (AMSS) layer to retrieve various communication parameters from upper layers (such as application layers on the same or disparate devices). In one example, a buffer level can be retrieved relating to size of a buffer storing packets for transmission from the communications apparatus 200. The buffer can be above a protocol layer (such as a transmit control protocol/internet protocol (TCP/IP), packet data convergence protocol (PDCP), point-to-point protocol (PPP) layer, etc.). In one example, the buffer is at an application layer, where data is stored for transmission from the application layer over the protocol or other packet forming layer, for example. Thus, in a laptop/modem type configuration, the communications apparatus 200 can relate to the modem receiving and buffering application data from the laptop. In this configuration, the buffer level can be computed at the laptop, and the mobile interface requestor 202 can communicate with the laptop to receive buffer levels. In a smartphone or similar device, however, the layers are all present in the communications apparatus 200, and the communication parameter monitor 204 itself can communicate within communications apparatus 200 to obtain buffer levels, in one example. Regardless of how obtained, it is to be appreciated that evaluating such a buffer size using the communication parameter monitor 204 can be indicative of how well throughput requirements for the communications apparatus 200 are being met. If the buffer size is large and/or increasing rapidly, the carrier requester 206 can be utilized to request an additional carrier to keep the buffer at a specified level, for example.

It is to be appreciated that additional parameters can be evaluated by the communication parameter monitor 204, with or without using the mobile interface requester 202 to obtain the parameters, to ensure requests for additional carriers are properly made by the carrier requestor 206. In one example, parameters, such as the buffer level, can be compared to a threshold. Moreover, the threshold can be related to a subscriber level for the communications apparatus 200. Thus, buffer thresholds for lower level subscribers can be greater than higher level to give the higher level subscribers greater priority with respect to requesting carriers via carrier requestor 206. In addition, other parameters can be evaluated by the communication parameter monitor 204 before determining to request a carrier via carrier requestor 206. In one example, the following equation, or a similar equation, can be utilized to determine when to request a carrier:

$$\left\{ \begin{array}{l} [BL_{Current} > \varphi_{UserBLRatio} * BL_{MCTriggerThreshold}] \,\&\& \\ [PA_{HEADROOM} > PA_{MCThreshold}] \,\&\& \\ [(T_{CURRENT} - T_{PreviousCarrierRequest}) > T_{MCThreshold}] \,\&\& \\ [N_{CarriersAssigned} < 3] \,\&\& \\ [MultiCarrierCapable = True] \end{array} \right.$$

where:

$BL_{Current}$ is the current buffer level above a segmentation and reassembly (SAR) layer, such as a TCP/IP, PDCP, and/or the like layer;

$\phi_{UserBLRatio}$ is the factor applied to the $BL_{MCTriggerThreshold}$ value that is applied to determine the actual threshold that is to be used by the different subscriber level of users (e.g., gold/silver/bronze);

$BL_{MCTriggerThreshold}$ is the threshold when the $BL_{Current}$ crosses this threshold, the carrier requester 206 triggers sending a request to add an additional carrier to the connection. This threshold can be chosen such that, temporary fades do not cause the carrier requestor 206 to necessarily trigger multi-carrier requests;

$PA_{HEADROOM}$ is the filtered value of the available headroom;

$PA_{MCThreshHold}$ is the minimum available PA headroom before allowing the carrier requester 206 to place a multi-carrier request;

$T_{CURRENT}$ is the current time;

$T_{PreviousCarrierRequest}$ is the time when the previous CarrierRequest message was sent requesting to add a carrier, which was not granted;

$T_{MCThreshHold}$ is the carrier request bar time that the carrier requester 206 should wait before sending another CarrierRequest message to add a carrier, for which the previously transmitted CarrierRequest to add a carrier has not been responded to by sending a traffic channel assignment (TCA) adding one or more carriers to the connection; and $N_{CarriersAssigned}$ is the number of carriers currently assigned to the connection.

It is to be appreciated that the communication parameter monitor 204 can evaluate the foregoing parameters against respective thresholds, where applicable, to determine when carrier requester 206 can request an additional carrier.

According to another example, the communication parameter monitor 204 can monitor an inflow and outflow data rate in addition or alternatively to the buffer level. The inflow data rate can relate to the rate at which data flows into a protocol layer, such as a TCP/IP, PDCP, and/or like layers, for transmission thereover, from an application layer. The outflow data rate can relate to the rate at which data is transmitted out over a media access control (MAC) layer to a physical (PHY) layer for transmission to one or more devices. Thus, in a laptop/modem configuration, the inflow data rate can be calculated at the laptop, and mobile interface requestor 202 can read inflow rates from the laptop while outflow rates can be read from layers present in the communications apparatus 200. Where the communications apparatus 200 comprises the application layer, however, the communication parameter monitor 204 can determine both inflow and outflow data rate readings. The inflow/outflow data rates can be comparatively evaluated (e.g., by forming a ratio). It is to be appreciated that the inflow/outflow data rate comparison can provide an indication of projected carrier need, whereas a buffer level can be more of a present need measurement. In one example, whether accessed via mobile interface requestor 202 or not, current and/or historical inflow data rate readings can be utilized to compute an inflow data rate (which can be a number of bits, packets, etc. per second or other unit of time). In one example the inflow can be computed using the following formula:

$$R_{IN} = \alpha_{IN} * R_{IN-Previous} + (1 - \alpha_{IN}) * R_{CURRENT};$$

where, $0 \leq \alpha_{IN} \leq 1$, $\alpha_{IN}$ is an exponential averaging multiplier to weigh importance of historical values over a current value;

initial value of $R_{IN-Previous} = 0$;

$$R_{CURRENT} = \sum_{i=(j) to (j-N_{InFlowRateSamples}+1)} \frac{R_i}{N_{InFlowRateSamples}};$$

where j is the current index for a set of $N_{InFlowRateSamples}$ inflow data rate determinations, where $N_{InFlowRateSamples}$ is an integer greater than 0. If there are less than $N_{InFlowRateSamples}$ readings available, then $N_{InFlowRateSamples}$ can be restricted to the number of readings available.

Similarly, the outflow can be computed using historical and/or current values. In one example, the following formula can be used:

$$R_{OUT} = \alpha_{OUT} * R_{OUT-Previous} + (1 - \alpha_{OUT}) * R_{CURRENT};$$

where, $0 \leq \alpha_{OUT} \leq 1$, $\alpha_{OUT}$ is an exponential averaging multiplier to weigh importance of historical values over a current value;

initial value of $R_{OUT-Previous} = 0$;

$$R_{CURRENT} = \sum_{i=(j) to (j-N_{OutFlowRateSamples}+1)} \frac{R_i}{N_{OutFlowRateSamples}};$$

where j is the current index for a set of $N_{OutFlowRateSamples}$ outflow data rate determinations, where $N_{OutFlowRateSamples}$ is an integer greater than 0. If there are less than $N_{OutFlowRateSamples}$ reading available, then $N_{OutFlowRateSamples}$ can be restricted to the number of readings available.

In an example, a resulting inflow/outflow data rate ratio can be formed and compared to a threshold to determine when carrier requester 206 can request an additional carrier for communication. In another example, the communication parameter monitor 204 can utilize the inflow/outflow data rates to compute trends over a period of time where a time for an additional carrier allocation can be estimated based on the trend. For example, where the data coming in (inflow data) is larger than that going out (outflow data) beyond a threshold level, additional carriers can be requested to handle the difference. In addition, the communication parameter monitor 204 can sample the inflow/outflow ratio at disparate points in time to determine a trend for the ratio; the carrier requester 206 can additionally or alternatively request additional carriers based on this trend, for example. It is to be appreciated that additional carriers may or may not be received upon request by the carrier requester 310 depending on further considerations at the allocator, as described herein. However, where additional carriers are received, the additional carriers can be utilized in subsequent communications.

Figure 3:
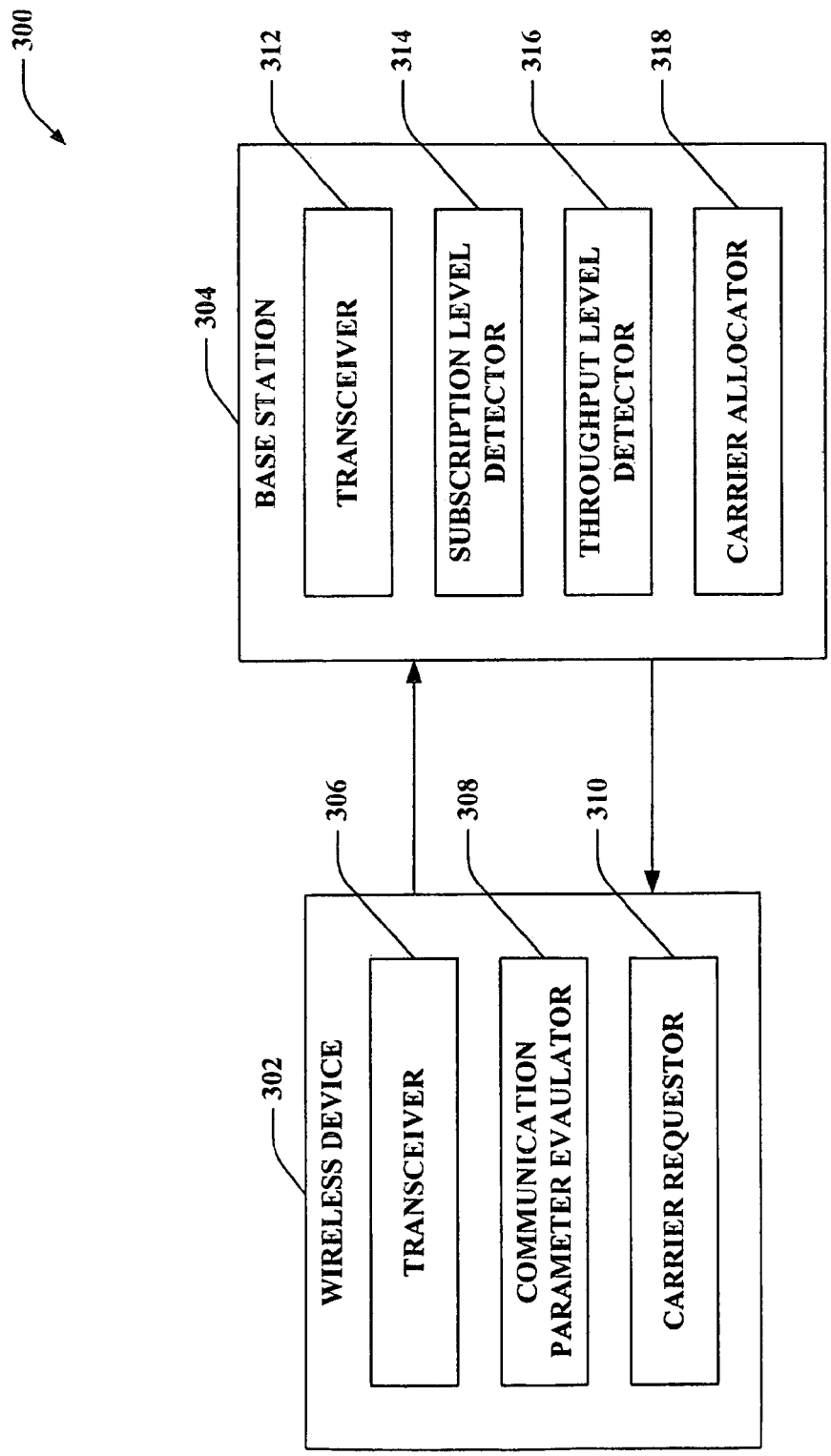
FIG. 3 is an illustration of an example wireless communications system that effectuates allocating additional carriers to a wireless device.

Now referring to FIG. 3, illustrated is a wireless communications system 300 that facilitates additional carrier request and allocation. Wireless device 302 can be a mobile device (including not only independently powered devices, but also modems, for example), or portion thereof. In one example, wireless device 302 can transmit information to base station 304 over a reverse link or uplink channel; further wireless device 302 can receive information from base station 304 over a forward link or downlink channel. Moreover, system 300 can be a MIMO system and/or can conform to one or more wireless network system specifications (e.g., EV-DO, 3GPP, 3GPP2, 3GPP LTE, etc.), and the wireless device 302 and base station 304 can simultaneously communicate with each other over multiple carriers. Also, the components and functionalities shown and described below in the wireless device 302 can be present in the base station 304 as well and vice versa, in one example; the configuration depicted excludes these components for ease of explanation.

Wireless device 302 includes a transceiver 306 for communicating with base station 304 and/or one or more access points in a wireless network over one or more carriers, a communication parameter evaluator 308 that can determine a change in one or more communication parameters, and a carrier requestor 310 that can request additional carrier assignment from the base station 304 based at least in part on the change in parameter(s). In one example, the communication parameter evaluator 308 can monitor the one or more communications parameters to determine when the parameters fall below or exceed a specified threshold. Upon this event, the carrier requestor 310 can request an additional carrier for communication with the base station 304. In addition, as described further below, one or more of the communication parameters can be a calculation of communication parameters, such as a ratio of inflow at an application layer to outflow at a protocol layer, for example. The communication parameters can additionally be a combination of standalone and calculated parameters, as described.

Base station 304 includes a transceiver 312 that facilitates communication with the wireless device 302 over one or more carriers, a subscription level detector 314 that can determine a subscription level of the wireless device 302 upon receiving a request for additional carrier assignment, a throughput level detector that can measure a level of throughput over reverse link communication with the wireless device 302, and a carrier allocator 318 that can assign additional carriers to the wireless device 302 based at least in part on the subscription level thereof and/or the measured throughput level.

According to an example, the wireless device 302 can utilize transceiver 306 to communicate with transceiver 312 of the base station 304 over one or more carriers. The communication parameter evaluator 308 can detect a change in a communication parameter during the communication, such as a buffer level, inflow/outflow comparison, subscription level, available PA headroom, timer for requesting additional carriers, number of carriers already being utilized in the communication, and/or the like. In another example, the communication parameter evaluator 308 can calculate a parameter based on one or more of the aforementioned parameters to determine a change in the calculated parameter. Where one or more parameter values change such that it exceeds or falls below a specified threshold, as described above, the carrier requester 310 can request allocation of an additional carrier from the base station 304 over transceiver 306. The base station 304 can receive the request over transceiver 312, and can grant or deny the request based on a number of additional factors, such as subscriber level, available resources, throughput levels, and/or the like as described herein.

In one example, the carrier requester 310 can request the additional carrier based at least in part on a buffer level measured by the communication parameter evaluator 308. For example, the buffer level can relate to a buffer storing data for transmission to the base station 304. When the buffer level reaches a threshold level (e.g., because data is being produced by an application related to the wireless device 302 faster than it is being transmitted to the base station 304 over the provided carriers), the communication parameter evaluator 308 can determine an additional carrier should be requested, or can evaluate further parameters to determine such. In one example, the threshold level for the buffer can be modified based at least in part on a subscription level of a user of the wireless device 302, which can be a level purchased by the user, for example, and can change upon obtaining a higher level of service. For example, a gold, silver, bronze scheme can be used in one example where gold users (e.g., having a premium level of service) can request additional carriers at a lower buffer level than silver or bronze. In one example, the subscription level can have a corresponding threshold. In another example, the subscription level can relate to a multiplier to utilize in computing a threshold buffer level for requesting an additional carrier. In any case, the threshold for the buffer level can be set high enough so that temporary fades in communication (resulting in temporary increase in buffer level) do not necessarily cause the carrier requester 310 to request an additional carrier. According to an example, the buffer level can be measured through an interface (not shown) that can indicate a lower layer buffer level to, for example, modem software (such as an AMSS layer) for utilization in requesting an additional carrier.

Furthermore, the communication parameter evaluator 308 can compare additional parameters to determine when carrier requestor 310 can request an additional carrier for communication. In one example, the communication parameter evaluator 308 can additionally analyze PA headroom of the wireless device 302 to determine feasibility of adding a carrier. The PA headroom can be compared to a threshold minimum PA headroom for requesting an additional carrier. In this regard, though enough PA headroom is available in the wireless device 302 to request the additional carrier and/or communicate over control channels related thereto, there may not be enough PA headroom to effectively communicate over the additional carrier. Thus, evaluating the PA headroom against a threshold allows the wireless device 302 to determine a benefit of requesting the additional carrier before actually expending the resources to do so.

In addition, a time can be evaluated by the communication parameter evaluator 308 before requesting an additional carrier via carrier requestor 310. In this regard, a current time can be compared to a carrier request bar time (e.g. indicating when an additional carrier can be requested). For example, the wireless device 302 can have received this time in a previous request for additional carrier where the base station 304 indicated the new time to avoid being flooded with additional requests. In another example, the time can be coded in the wireless device 302 or otherwise received from a disparate device, such as a disparate wireless network component. Moreover, a number of carriers already allocated to the wireless device 302 can be evaluated by the communication parameter evaluator 308 before requesting an additional carrier. For example, the base station 304 can implement a maximum number of carriers allocable to a single device. This can be per base station 304 and/or a network specification. In any case, the wireless device 302 can receive the maximum number (e.g., from a hardcoded parameter or by receipt from a wireless network component) and can compare the number of carriers allocated to it to the maximum. If the number of allocated carriers is substantially equivalent to the maximum, the wireless device 302 can forego the request for additional carriers despite the other parameters.

In yet another example, the communication parameter evaluator 308 can utilize an inflow/outflow comparison in addition or alternatively to the buffer level. The inflow/outflow comparison can relate to a measured inflow of data from an application as compared to a measured outflow of data over the transceiver 306 utilizing carriers assigned by the base station 304. Similarly to the buffer level, this information can be acquired from an interface that communicates up to modems software (such as an AMSS layer) and/or determined based on activity in the modem software. Utilizing this parameter allows for a more predictive evaluation of requiring an additional carrier whereas the buffer level can indicate a current need. In addition, the communication parameter evaluator 308 can compare the inflow/outflow comparison parameter to a threshold that can also be influenced by a subscription level. Thus, the threshold can relate directly to the subscription level and/or can be multiplied by a factor related to the subscription level, for example. Additionally, determining whether to request an additional carrier via carrier requestor 310 can be based on the inflow/outflow comparison and one or more of the other parameters described above.

In the foregoing examples, the wireless device 302 requests additional carriers in a greedy manner, and the base station 304 need not grant all requests received. Rather, a decision to grant additional carriers can be based on one or more observations related to the base station 304 as well. According to one example, the subscription level detector 314 can determine a subscription level for the wireless device 302. The carrier allocator 318 can analyze a number of carriers already allocated to the device against the subscription level to determine if another carrier can be allocated according to the subscription level. Thus, the subscription levels can relate to a maximum number of allocable carriers. For example, a gold level can receive 3 carriers while a silver can receive 2 and a bronze 1. The subscription level can be specified in the request for additional carriers, initial request for communication, and/or received from one or more additional network components, for instance. In addition, the carrier allocator 318 can allocate carriers to the wireless device 302 based further on available resources. For example, if the base station 304 does not have additional carriers, it cannot allocate carriers to the wireless device 302 regardless of subscription level. Additionally, in this regard, the carrier allocator 318 can allocate with priority based on the subscription level and/or can regulate MAC parameters so a number of tokes made available for transmission can be more limited for a bronze compared to a gold user, for example. In another example, the carrier allocator 318 can divide a number of available carriers into groups for each subscription level thus reserving additional carriers for higher subscription levels.

In another example, the throughput level detector 316 can measure a throughput level of reverse link communication with wireless device 302 over transceiver 312. The carrier allocator 318 can additionally or alternatively allocate an additional carrier to the wireless device 302 based at least in part on the throughput level. For example, the throughput level detector 316 can compare the reverse link throughput to a threshold level of service; where the throughput falls below the threshold, the carrier allocator 318 can allocate an additional carrier to the wireless device 302 (e.g., if enough resources are available at the base station 304). Alternatively, if the measured throughput is above a threshold, the additional carrier request can be denied. In addition, the threshold levels of service can be based at least in part on the subscription levels; thus, the carrier allocator 318 can allocate additional carriers based on both the throughput and subscription level, in one example. If the carrier allocator 318 assigns an additional carrier to the wireless device 302, notification can be sent to the wireless device 302, and the wireless device 302 can begin using the carrier in subsequent transmissions over the transceiver 306. If the carrier allocator 318 denies the request, the base station 304 can notify the wireless device 302 of the denial. In one example, the base station 304 can include a time for re-requesting additional carriers in the denial to ensure it is not flooded with requests for such from the wireless device 302.

Figure 4:
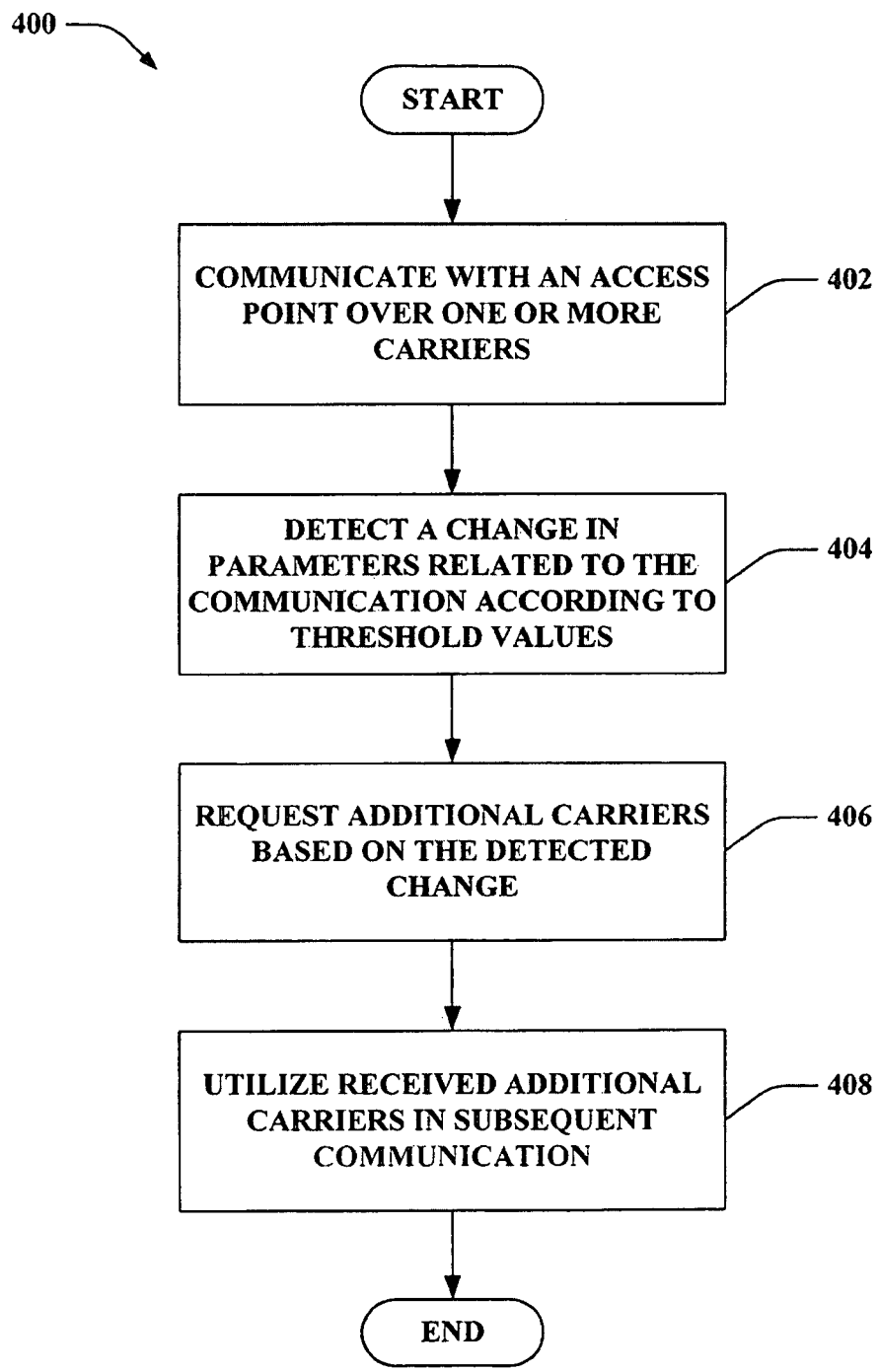
FIG. 4 is an illustration of an example methodology that facilitates requesting additional carriers in wireless communications.
Figure 5:
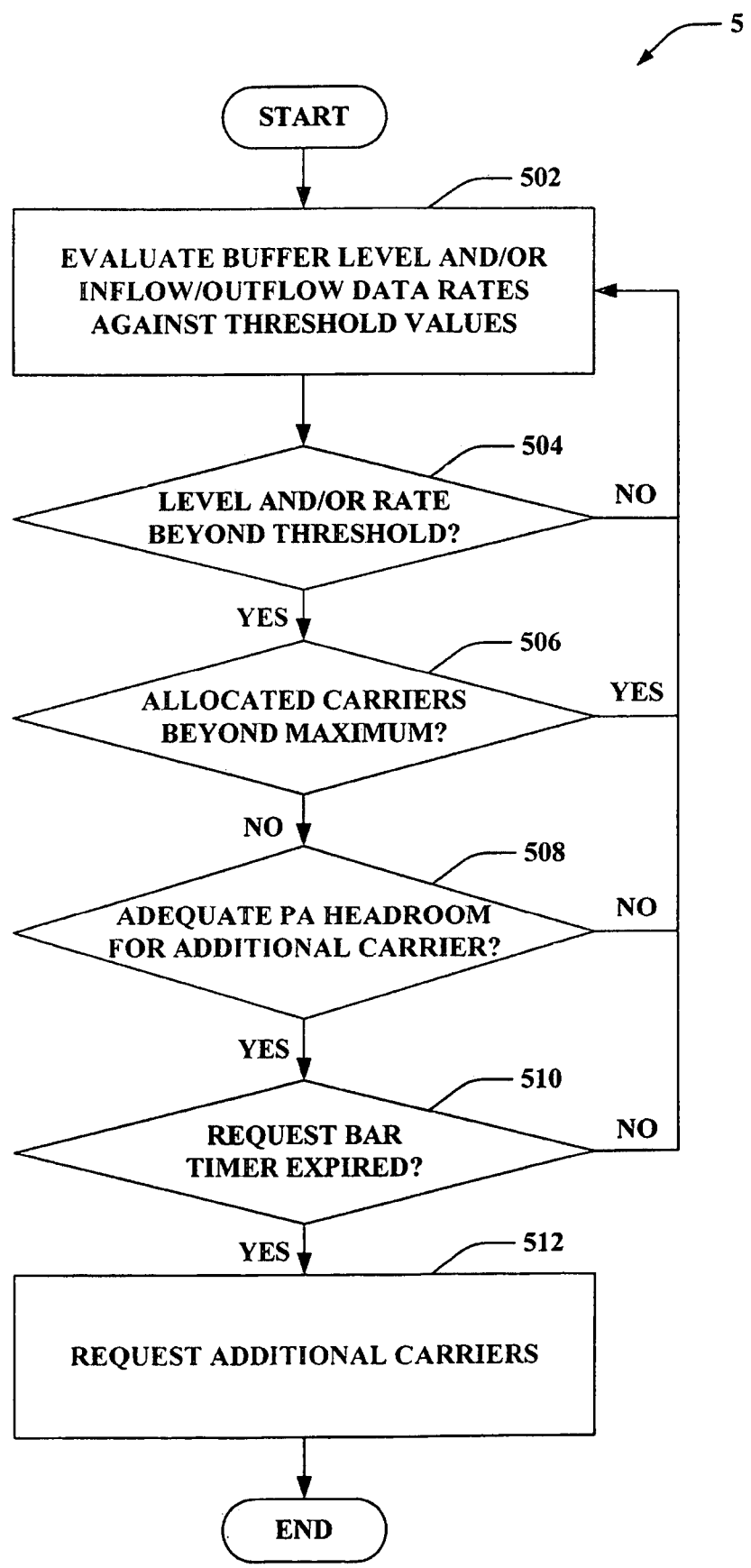
FIG. 5 is an illustration of an example methodology that facilitates determining whether to request additional carriers.
Figure 6:
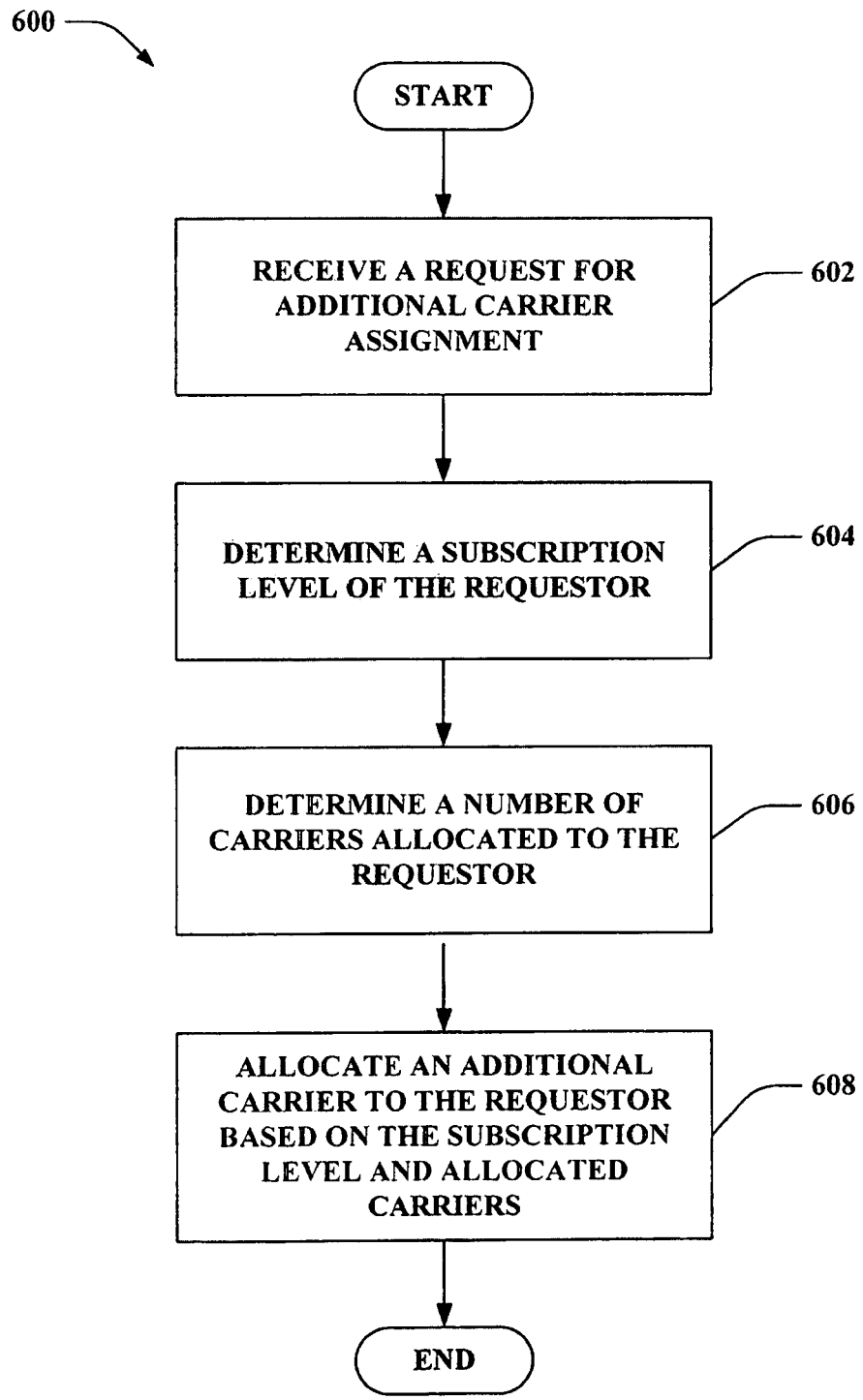
FIG. 6 is an illustration of an example methodology that facilitates granting or denying requests for additional carriers.

Referring to FIGS. 4-6, methodologies relating to requesting and allocating additional frequency carriers to a mobile device in wireless communication networks are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 4, a methodology 400 that facilitates requesting additional carriers in wireless communication networks is displayed. At 402, communication with an access point can occur over one or more carriers. The carriers, in one example, can be initially allocated according to a service level, available resources, etc. At 404, a change in parameters related to communication can be detected according to threshold values. As described, the parameters can relate to a buffer level, inflow/outflow comparison, PA headroom, time for requesting additional carriers, a maximum number of allocated carriers, and/or the like. The threshold values can be based on, or affected by, a subscription level. For example, as described, a threshold buffer level or inflow/outflow comparison for requesting additional carriers can be multiplied by a factor based on subscription level to ensure higher levels receive additional carriers at more desirable parameter values than lower levels. Thus, the change is detected based at least in part on comparing values to the thresholds and/or receiving notification of a change in the value by monitoring and/or receiving an event, for example.

At 406, additional carriers can be requested based on the detected change. Thus, as described, this can be based on comparison of one or more of the above values. For example, requesting the additional carriers can be based on buffer level and/or inflow/outflow data rates, as compared to threshold values. The additional carriers can be requested based also in part on available PA headroom (e.g., whether expending the resources to acquire the channel would be beneficial given available headroom for not only related control channels, but the actual data channel as well, as described). Further, the maximum number of carriers can be evaluated in the comparison with other metrics, as described. Thus, it is to be appreciated that substantially any number of the foregoing and additional parameter related to the communication can be evaluated to request additional carriers. At 408, the received additional carriers can be utilized in subsequent communication increasing throughput for the communication.

Referring to FIG. 5, a methodology 500 that facilitates determining whether to request additional carriers is displayed. At 502, a buffer level and/or inflow/outflow data rates are evaluated against threshold values as described previously. According to an example, as described, the buffer level and/or inflow parameters can be retrieved from an application layer using an interface. At 504, it is determined whether the buffer level and/or inflow/outflow rates are beyond threshold values. As described, the threshold values can be set and/or modified according to a subscriber level. If not, then the methodology proceeds back to 502. It is to be appreciated that a timer can be utilized before the evaluation occurs again at 502; furthermore, continuance to step 502 can be based at least in part on an event related to the buffer level and/or inflow/outflow data rates. If the values are beyond the threshold, then at 506, it is determined whether allocated carriers are beyond a maximum value. If so, again, the methodology can proceed to step 502. If not, however, at 508, it can be determined whether there is adequate PA headroom for an additional carrier. This can be determined based at least in part on comparison to a threshold as described herein. If not, the methodology again proceeds to 502. If so, however, it can be determined whether a carrier request bar timer has expired at 510. The request bar timer, as described, can specify a time for barring request of additional carriers as to not flood a system with requests. If the request bar timer has not expired, the methodology proceeds to 502. If it has expired, at 512 additional carriers can be requested as described.

Turning now to FIG. 6, illustrated is a methodology 600 that facilitates allocating additional carriers to a mobile device in wireless communications. At 602, a request for additional carrier assignment can be received. As described, the request can be made from a mobile device based on determinations regarding need of an additional carrier; however, the additional carrier allocation need not be granted. At 604, a subscription level of the requester can be determined. Thus, allocating the additional carrier can relate to the subscription level. Additionally, at 606, a number of carriers allocated to the requestor can be determined. At 608, an additional carrier can be allocated to the requester based on the subscription level and allocated carriers. Thus, for example, different subscriber levels can have differing thresholds for maximum allocable carriers. The threshold can be compared to a number already allocated to determine whether an additional carrier can be allocated. It is to be appreciated, as described, that the allocation can be further based on additional characteristics, such as available resources in one example.

It will be appreciated that, in accordance with one or more aspects described herein, inferences can be made regarding determining inflow/outflow parameters and/or determining change in such or additional parameters, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
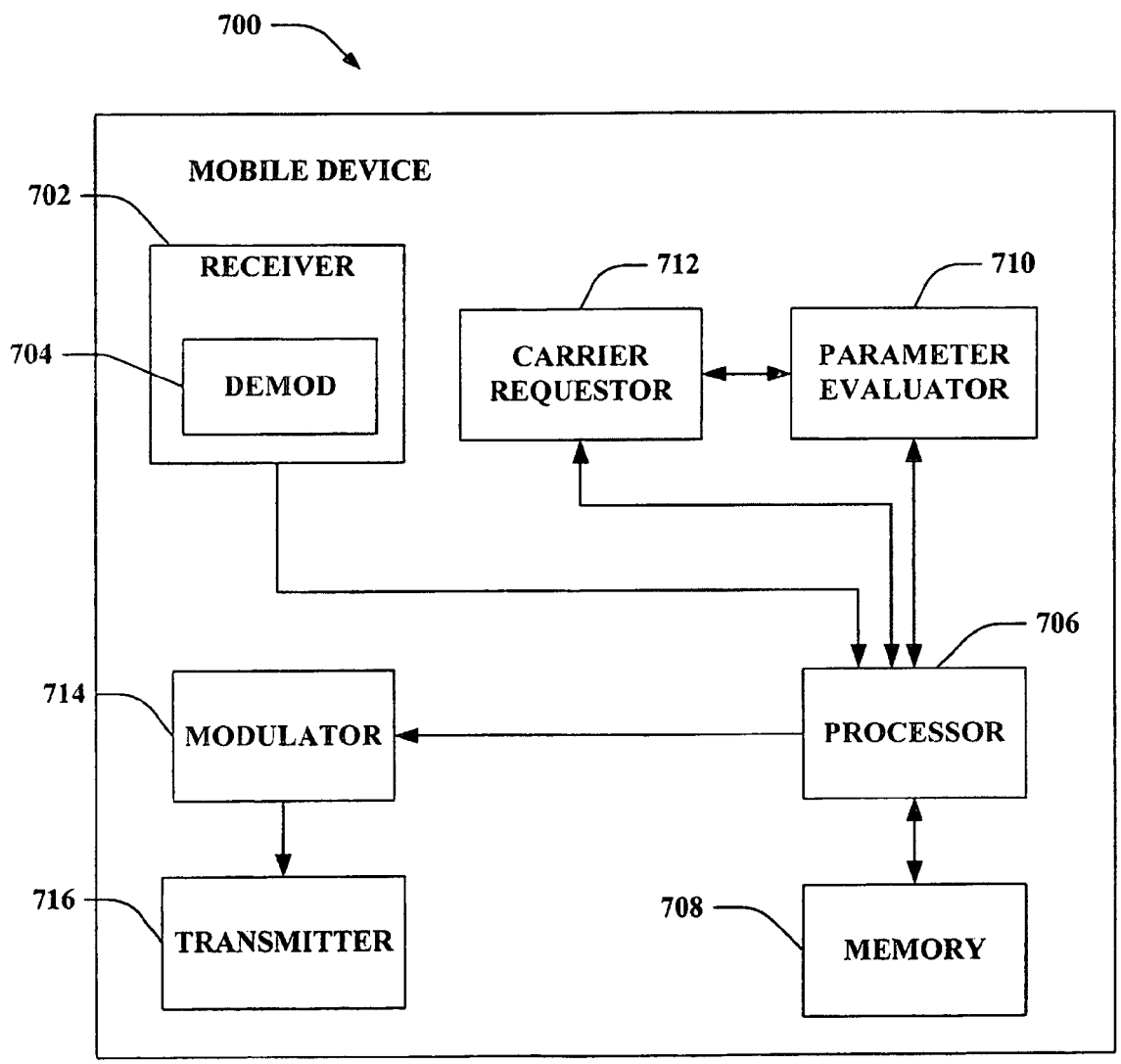
FIG. 7 is an illustration of an example mobile device that facilitates requesting additional carriers in wireless communications.

FIG. 7 is an illustration of a mobile device 700 that facilitates requesting additional carriers in wireless communication networks. Mobile device 700 comprises a receiver 702 that receives one or more signals over one or more carriers from, for instance, a receive antenna (not shown), performs typical actions on (e.g., filters, amplifies, downconverts, etc.) the received signals, and digitizes the conditioned signals to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to a parameter change detector 710 that can determine change in a communication parameter (such as by receiving notification of a modification, in one example). This can be from monitoring or evaluating the parameter or from a received event, for example. In one example, a buffer level can be analyzed to determine if it has reached a specified threshold, which can relate to a subscriber level as described. It is to be appreciated that an event can be received by the parameter evaluator 710 in one example causing it to analyze the buffer level. In another example, an inflow/outflow data rate can be the parameter similarly evaluated. The buffer level and inflow data rate can be received from an application layer. If the layer is external to the mobile device 700 (such as in a laptop where the mobile device 700 is a modem), an interface can be utilized to obtain the parameters. The outflow data rate, in one example, can be received from the transmitter 716 from one or more layers (e.g., MAC, PHY, etc.).

Moreover, additional parameters can be evaluated separate from or in conjunction with the foregoing to determine when an additional carrier can be requested. For example, as described, available PA headroom can be analyzed to determine whether there is enough PA headroom in the mobile device 700 to handle an additional carrier. Also, a maximum number of carriers and/or a request bar timer can be considered, as described, before requesting additional carriers. If an additional carrier can be requested, the carrier requester 712 can formulate a request that can be transmitted to an access point. Mobile device 700 still further comprises a modulator 714 and transmitter 716 that respectively modulate and transmit signals to, for instance, a base station, another mobile device, etc. Although depicted as being separate from the processor 706, it is to be appreciated that the parameter evaluator 710, carrier requester 712, demodulator 704, and/or modulator 714 can be part of the processor 706 or multiple processors (not shown).

Figure 8:
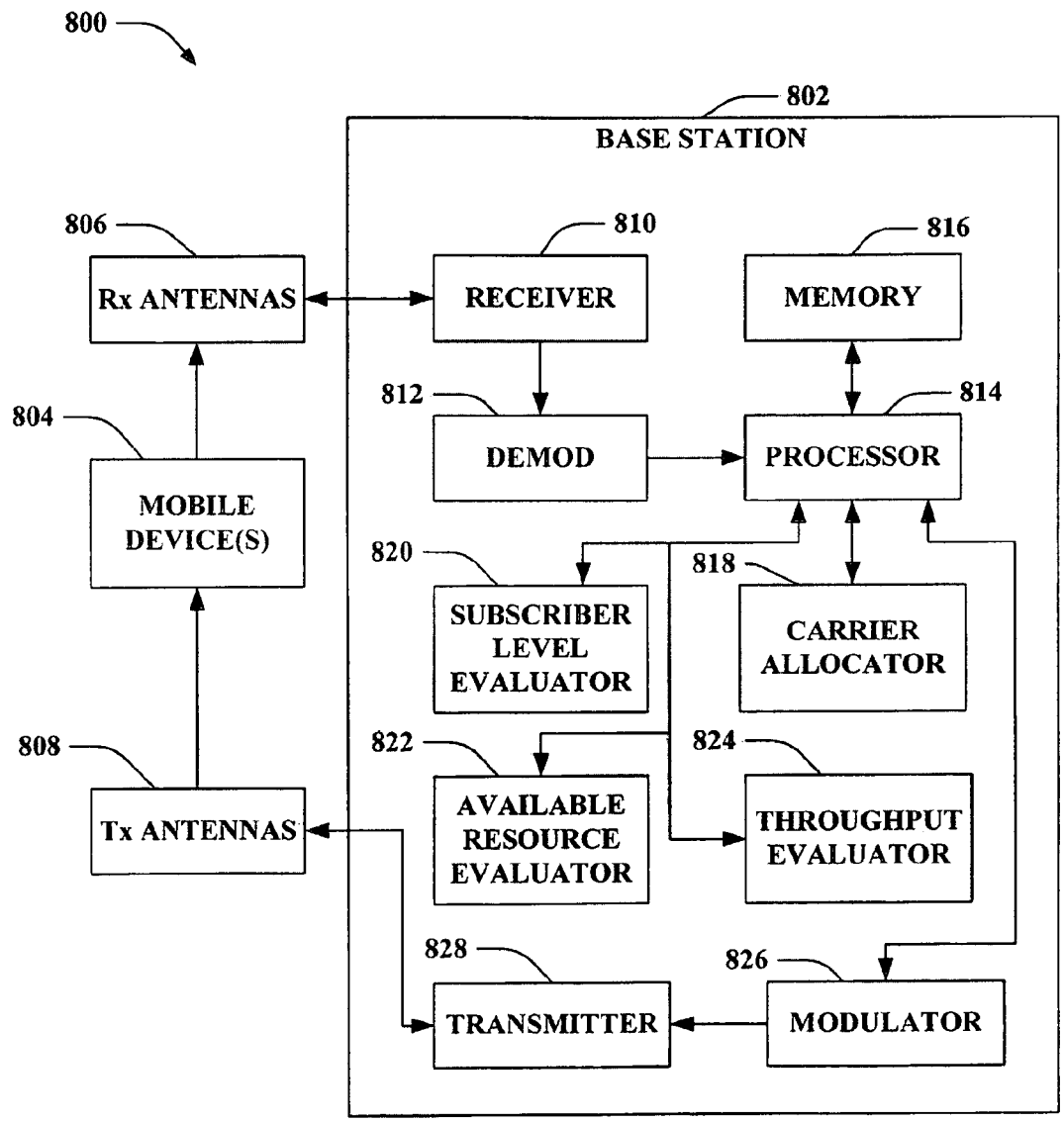
FIG. 8 is an illustration of an example system that responds to requests for additional carriers.

FIG. 8 is an illustration of a system 800 that facilitates allocating carriers to mobile devices in wireless communication networks. The system 800 comprises a base station 802 (e.g., access point, . . . ) with a receiver 810 that receives signal(s) from one or more mobile devices 804 through a plurality of receive antennas 806, and a transmitter 828 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a carrier allocator 818 that can allocate additional carriers to mobile device(s) 804 when needed as well as a subscriber level evaluator 820, available resources evaluator 822, and a throughput evaluator 824 that can be utilized to determine whether to grant a request for additional carriers from the mobile device(s) 804.

According to an example, the base station 802 can receive a request for one or more additional carriers from a mobile device 804 communicating with the base station (e.g., over receiver 810). The subscriber level evaluator 820 can determine a subscriber level for the mobile device 804, and the carrier allocator 818 can allocate an additional carrier to the mobile device 804 based at least in part on this information. For example, as described, the carrier allocator 818 can reserve carriers based at least in part on subscriber level, reserving a higher number for higher level subscribers. In another example, the carrier allocator 818 can allocate a given number of carriers per subscriber level; thus, the carrier allocator 818 can additionally evaluate the number of carriers allocated to the mobile device 804 as well as the subscriber level in deciding when to allocate an additional carrier. Moreover, the available resource evaluator 822 can determine resources at hand in the base station 802 for allocating carriers. The determination to allocate an additional carrier can further be based on the available resources. In addition, the throughput evaluator 824 can analyze reverse link throughput for the mobile device 804 such that the determination to allocate additional carriers can be further based on the throughput achieved. Thus, if the throughput is above a threshold (which can similarly be based on subscriber level), the carrier allocator 818 can deny a request to add one or more carriers. Furthermore, although depicted as being separate from the processor 814, it is to be appreciated that the carrier allocator 818, subscriber level evaluator 820, available resource evaluator 822, throughput evaluator 824, demodulator 812, and/or modulator 826 can be part of the processor 814 or multiple processors (not shown).

Figure 9:
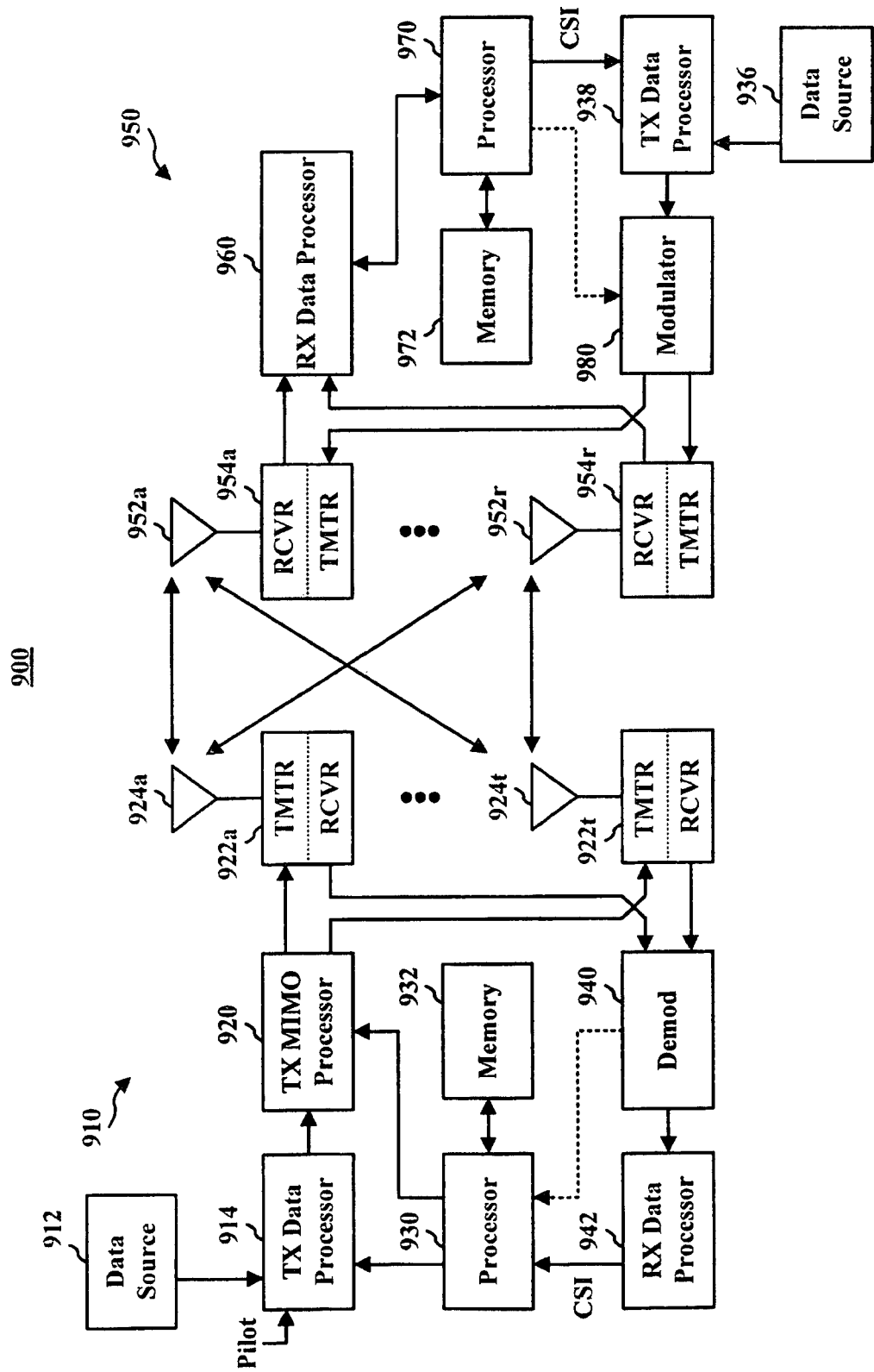
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8) and/or methods (FIGS. 4-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g. control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
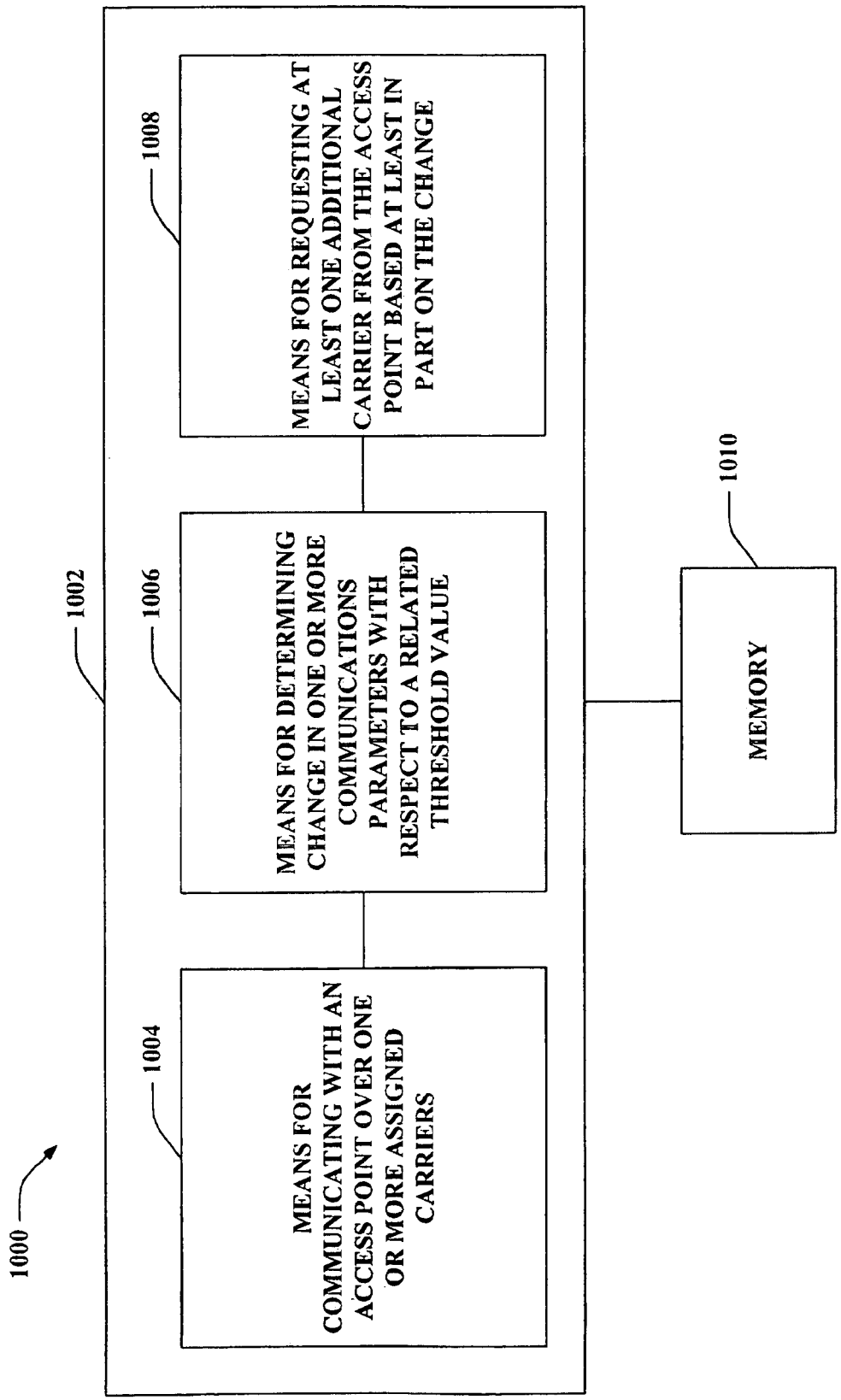
FIG. 10 is an illustration of an example system that requests additional carrier assignment from an access point.

With reference to FIG. 10, illustrated is a system 1000 that requests additional carriers for communication in a wireless network. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of means that can act in conjunction. For instance, logical grouping 1002 can include means for communicating with an access point over one or more assigned carriers 1004. For example, the system 1000 can receive wireless service from the access point over the assigned carriers. Further, logical grouping 1002 can comprise means for determining change in one or more communications parameters with respect to a related threshold value 1006. In one example, as described, the one or more communications parameters can relate to a buffer level for a protocol layer of the system 1000 and/or an inflow/outflow data rate between an application layer and the protocol layer. In addition, other parameters can be considered, as described, including available PA headroom for an additional carrier, a number of allocated carriers, a timer for requesting the carrier, and/or the like. Furthermore, logical grouping 1002 can include means for requesting at least one additional carrier from the access point based at least in part on the change 1008. If the additional carrier is granted, the system 1000 can utilize the carrier in subsequent communications with the access point, for example. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
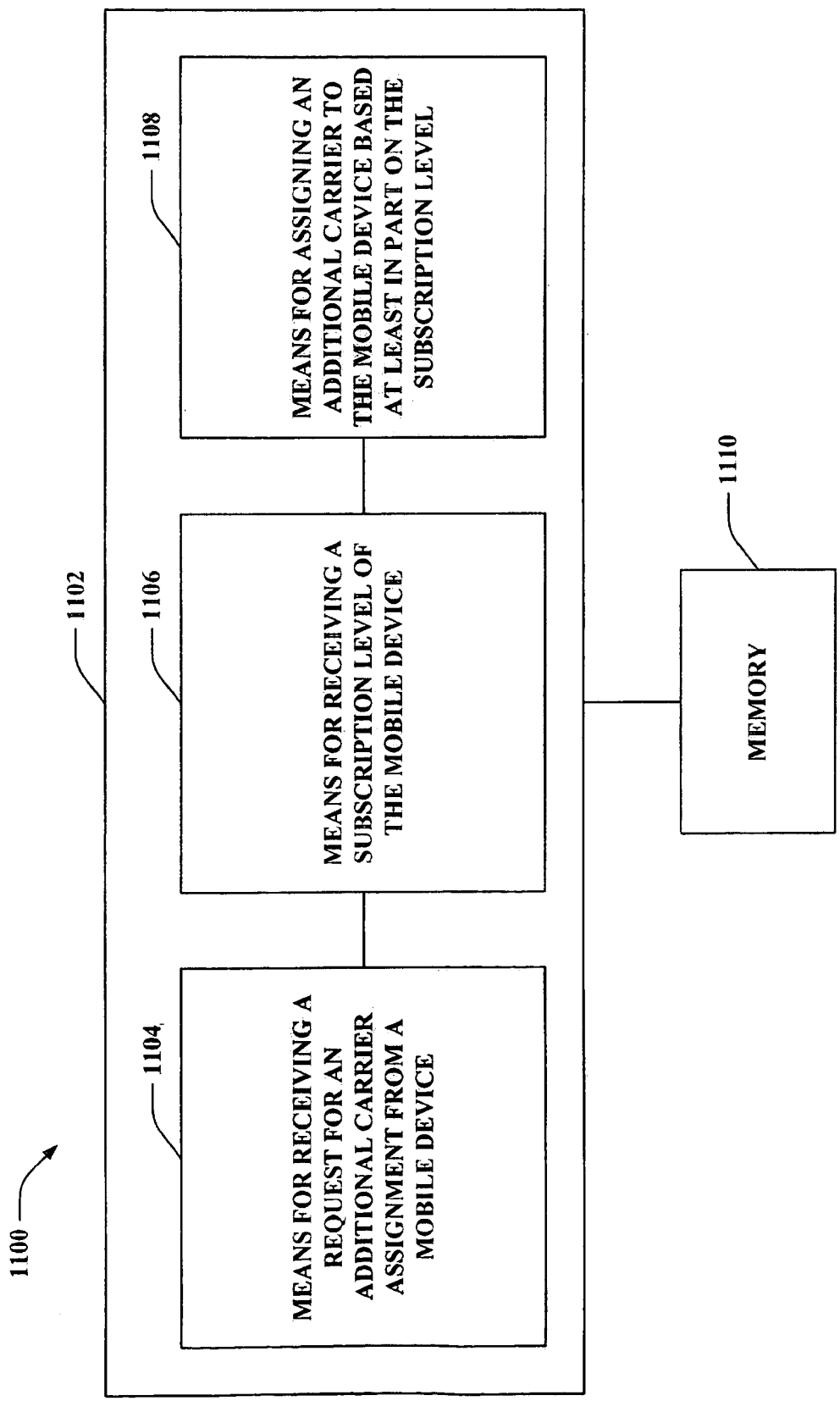
FIG. 11 is an illustration of an example system that assigns additional carriers in wireless communications.

Turning to FIG. 11, illustrated is a system 1100 that receives carrier requests and grants or denies the requests based at least in part on additional considerations. System 1100 can reside within a base station, mobile device, etc., for instance. As depicted, system 1100 includes functional blocks that can represent functions implemented by a processor, software, or combination thereof (e.g., firmware). System 1100 includes a logical grouping 1102 of means that facilitate granting or denying carrier requests. Logical grouping 1102 can include means for receiving a request for an additional carrier assignment from a mobile device 1104. As described, this can be transmitted following some processing at the mobile device to determine whether an additional carrier can be accommodated. Moreover, logical grouping 1102 can include means for receiving a subscription level of the mobile device 1106. The subscription level can be a tiered level, for example, where additional carrier assignment can be based on the subscription level. Thus, logical grouping 1102 can also include means for assigning an additional carrier to the mobile device based at least in part on the subscription level 1108. In this regard, for example, higher subscription levels can be allocated additional carriers more often than lower subscription levels. In one example, this can be achieved by allocating a number of carriers for each group of subscriber level. In another example, a maximum number of carriers for subscribers at each level can be specified and complied with. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What is claimed is:

1. A method for requesting one or more additional carriers in a wireless communication network, comprising:
   communicating with an access point over one or more carriers;
   detecting a change in one or more communication parameters based on a plurality of threshold values for the one or more communication parameters, wherein each threshold value in the plurality of threshold values corresponds to a separate subscription type of a mobile device user, and wherein the one or more communication parameters comprise a ratio of an inflow data rate and an outflow data rate measured respectively at an application layer and a protocol layer in communicating with the access point; and
   requesting one or more additional carriers from the access point based at least in part on the detected change and at least in part on comparing a current time to a carrier request bar time during which requesting the one or more additional carriers is prohibited.

2. The method of claim 1, wherein the one or more communication parameters further comprise a level of a buffer that stores data for communicating to the access point and wherein the threshold value for that communication parameter comprises a threshold value for the level of the buffer.

3. The method of claim 2, wherein the buffer is at a protocol layer and receives data from an application for transmission over the one or more carriers.

4. The method of claim 3, further comprising receiving the level of the buffer from the protocol layer via an interface.

5. The method of claim 1, wherein the one or more communication parameters further comprise a current power amplifier (PA) headroom where the threshold value for that communication parameter is a minimum PA headroom required to request the one or more additional carriers.

6. The method of claim 1, wherein the carrier request bar time is specified by the access point in response to a previous request for the one or more additional carriers.

7. The method of claim 1, wherein requesting one or more additional carriers from the access point is further based at least in part on comparing a number of carriers currently utilized to a maximum number of carriers allowed.

8. The method of claim 1, further comprising receiving the one or more additional carriers from the access point and utilizing the one or more additional carriers in subsequent communication with the access point.

9. The method of claim 1, wherein communicating with the access point is performed over an evolution data optimized (EV-DO) network.

10. The method of claim 1, further comprising modifying the threshold value based at least in part on a change in the subscription type of the mobile device user.

11. The method of claim 1, further comprising defining the threshold value to be dependent, at least in part, on the subscription level of the mobile device user such that the threshold value is higher for a lower subscription level as compared to the threshold value for a higher subscription level.

12. The method of claim 2, further comprising defining the threshold value for the level of the buffer to be dependent, at least in part, on the subscription level of the mobile device user such that the threshold value is higher for a lower subscription level as compared to the threshold value for a higher subscription level.

13. A method for requesting one or more additional carriers in a wireless communication network, comprising:
communicating with an access point over one or more carriers;
detecting a change in one or more communication parameters based on a plurality of threshold values for at least one of the one or more communication parameters, wherein the one or more communication parameters comprise a ratio of an inflow data rate and an outflow data rate measured respectively at an application layer and a protocol layer in communicating with the access point, wherein each threshold value in the plurality of threshold values for the at least one or more communication parameter corresponds to a separate subscription type of a mobile device user, such that respectively different threshold values are used for respectively different subscription types; and
requesting one or more additional carriers from the access point based at least in part on the detected change.

14. The method of claim 13, wherein the inflow data rate and the outflow data rate are computed based at least in part on comparison between current and historical data rates.

15. The method of claim 13, wherein a higher level subscriber relates to a lower threshold comparison value than a lower level subscriber.

16. A wireless communications apparatus, comprising:
at least one processor configured to:
communicate with a base station over at least one assigned carrier;
monitor one or more communication parameters to detect a change based on a plurality of threshold values for the one or more communications parameters, wherein each threshold value corresponds to a separate subscription type of a mobile device user, and the one or more communication parameters comprise a ratio of an inflow data rate and an outflow data rate in communicating with the base station; and
request an additional carrier assignment from the base station based at least in part on the detected change and at least in part on comparing a current time to a carrier request bar time during which requesting the additional carrier assignment is prohibited; and
a memory coupled to the at least one processor.

17. The apparatus of claim 16, wherein the at least one processor further configured to modify the threshold value based at least in part on a change in the subscription type of the mobile device user.

18. A wireless communications apparatus that facilitates requesting additional carriers over a wireless network, comprising:
means for communicating with an access point over one or more assigned carriers;
means for determining a change in one or more communications parameters based on a plurality of related threshold values, wherein each threshold value in the plurality of threshold values corresponds to a separate subscription type of a mobile device user, and wherein the one or more communication parameters comprise a ratio of an inflow data rate and an outflow data rate in communicating with the access point; and
means for requesting at least one additional carrier from the access point based at least in part on the change and at least in part on comparing a current time to a carrier request bar time during which requesting the at least one additional carrier is prohibited.

19. The apparatus of claim 18, further comprising means for modifying the threshold value based at least in part on a change in the subscription type of the mobile device user.

20. A computer program product, comprising:
a computer-readable non-transitory storage medium comprising:
code for causing at least one computer to communicate with an access point over one or more carriers;
code for causing the at least one computer to detect a change in one or more communication parameters based on a plurality of threshold values for the one or more communication parameters, wherein each threshold value in the plurality of threshold values corresponds to a separate subscription type of a mobile device user, and wherein the one or more communication parameters comprise a ratio of an inflow data rate and an outflow data rate measured respectively at an application layer and a protocol layer in communicating with the access point; and
code for causing the at least one computer to request one or more additional carriers from the access point based at least in part on the detected change and at least in part on comparing a current time to a carrier request bar time during which requesting the one or more additional carriers is prohibited.

21. An apparatus, comprising:
a transceiver that is configured to facilitate communicating with an access point over one or more carriers;
a communication parameter evaluator that is configured to determine a change in one or more communication parameters based at least in part on comparison to a plurality of respective threshold values, wherein each threshold value in the plurality of threshold values corresponds to a separate subscription type of a mobile device user, and wherein the one or more communications parameters comprise a ratio of an inflow data rate and an outflow data rate in communicating with the access point; and
a carrier requestor that is configured to request an additional carrier from the access point based at least in part on the determined change and at least in part on a comparison of a current time to a carrier request bar time during which the request for the additional carrier is prohibited.

22. The apparatus of claim 21, wherein the one or more communication parameters further comprise a level of a protocol layer buffer that is configured to store data for communicating with the access point.

23. The apparatus of claim 22, wherein the respective threshold value for the level of the protocol buffer relates to a subscription type of a user of the mobile device.

24. The apparatus of claim 21, wherein the one or more communication parameters further comprise a current power amplifier (PA) headroom wherein the threshold value corresponds to the PA headroom is a minimum PA headroom for a request of the additional carrier.

25. The apparatus of claim 21, wherein the one or more communication parameters further comprise a number of carriers currently utilized where the respective threshold value is a maximum number of carriers allowed by the access point.

26. The apparatus of claim 21, wherein the communications parameter evaluator is further configured to measure the inflow data rate and the outflow data rate at an application layer and a protocol layer, respectively, of the mobile device in communicating with the access point.

27. The apparatus of claim 26, further comprising a mobile interface requestor that is configured to receive the inflow data rate from the application layer.

28. The apparatus of claim 26, wherein the communication parameter evaluator is further configured to calculate the inflow data rate and the outflow data rate based at least in part on current and historical data rates.

29. The apparatus of claim 21, wherein a higher level subscriber relates to a lower threshold value than a lower level subscriber.

* * * * *